(12) United States Patent
Galbreath

(10) Patent No.: US 6,494,535 B2
(45) Date of Patent: Dec. 17, 2002

(54) CHILD SEAT ANCHOR CONNECTOR

(76) Inventor: John Alexander Galbreath, Reisterstown, MD (US)

( * ) Notice: Subject to any disclaimer, the term of this patent is extended or adjusted under 35 U.S.C. 154(b) by 0 days.

(21) Appl. No.: 09/950,550

(22) Filed: Sep. 11, 2001

(65) Prior Publication Data

US 2002/0149243 A1 Oct. 17, 2002

Related U.S. Application Data

(60) Provisional application No. 60/231,593, filed on Sep. 11, 2000.

(51) Int. Cl.$^7$ ................................................. B60N 2/28
(52) U.S. Cl. ..................................... 297/253; 297/250.1
(58) Field of Search ............................... 297/250.1, 253, 297/468

(56) References Cited

U.S. PATENT DOCUMENTS

| | | | |
|---|---|---|---|
| 5,487,588 A | | 1/1996 | Burleigh et al. |
| 5,524,965 A | | 6/1996 | Barley |
| 5,816,651 A | | 10/1998 | Feuerherdt |
| 5,918,934 A | | 7/1999 | Siegrist |
| 5,941,601 A | | 8/1999 | Scott et al. |
| 6,030,046 A | | 2/2000 | Dorow |
| 6,082,819 A | | 7/2000 | Jackson |
| 6,183,044 B1 | * | 2/2001 | Koyanagi et al. ............ 297/253 |
| 6,193,310 B1 | * | 2/2001 | Batalaris et al. ............ 297/253 |
| 6,209,957 B1 | * | 4/2001 | Baloga et al. ............ 297/250.1 |
| 6,234,572 B1 | | 5/2001 | Shiino et al. |
| 6,276,754 B1 | | 8/2001 | Youssef-Agha et al. |

* cited by examiner

*Primary Examiner*—Peter R. Brown

(57) ABSTRACT

A device is utilized which connects a child safety seat, such as that used in an automobile, to an anchor bar installed in the automobile. The connector includes an anchor end adapted to engage the anchor bar, and a child seat end adapted for connecting to either flexible webbing or a solid connection point on a child safety seat. The anchor end has an inwardly beveled surface which forms a docking guide. The docking guide surrounds a rectangular area in the center of the anchor end, wherein a latch plate is located. In operation, the anchor end of the connector is positioned over and urged toward the anchor bar. The beveled front surface of the latch plate allows the anchor bar to urge the latch plate upward, against the resistance provided by a biasing spring. The connector is further urged onto the anchor bar until the anchor bar passes under the latch plate and into an anchor bar cavity, which retains the anchor bar within the connector. To release the connector from the anchor bar, the user depresses a release button located on the outer surface of the connector.

23 Claims, 14 Drawing Sheets

CHILD SEAT ANCHOR CONNECTOR

CROSS-REFERENCES TO RELATED APPLICATIONS

This is a continuation-in-part of applicant's Non-Provisional Application. Both this continuation application, and the Non-Provisional Application on which it is based, were filed on Sep. 11, 2001. It should also be noted that the Non-Provisional Application itself claimed priority to U.S. Provisional Application No. 60/231,593, filed Sep. 11, 2000.

BACKGROUND OF THE INVENTION

1. Field of the Invention

This invention is in the area of child seat connection systems, specifically a device which connects a child safety seat, such as that used in an automobile, to an anchor bar installed in the automobile.

2. Description of the Related Art

Child safety seats have been previously secured in automobiles by using the seat belts of the automobile - that is, the existing seat belts are threaded in or around the child safety seat and latched in the usual manner, ostensibly securing the safety seat to the automobile seat, and thus to the automobile itself.

Recently, the National Highway Traffic Safety Administration (NHTSA) mandated the use of standard anchor bars, installed in an automobile by the manufacturer, to secure child safety seats to the automobile. Correspondingly, child safety seat manufacturers are now required to provide, on their safety seats, means to engage the anchor bars installed in the automobile.

Using a simple hook connected to webbing attached to the safety seat, as a means to engage the anchor bar, has been contemplated by various child seat manufacturers. However, using a hook as a connector has several key disadvantages. Most important among these disadvantages is that it is difficult for a consumer to engage and disengage the hook from the anchor bar. A hooking and unhooking motion is required, which ordinarily would not be an insurmountable problem; however, the anchor bar is typically buried between the automobile seat cushions, and is not readily visible to a consumer. Thus, it is often difficult to maneuver the hook onto the anchor bar, and to remove it from the anchor bar.

Accordingly, several objects and advantages of my invention are:

It is easy, quick, and intuitive to use—yet safe and secure. A simple push-in or pull-out motion is all that is necessary to engage and disengage the anchor bar—no hooking or unhooking motions are required.

The device provides an "automatic" engagement onto the anchor bar—no buttons need to be pushed. And, it is quick and easy to release—consumers can easily see and reach the release button, because it's not hidden by the seat cushions.

The beveled anchor end of the connector, which guides the connector into place over the anchor bar, makes it easy to connect a child seat to the anchor bar.

It releases under tension more conveniently than a hook fastener—that is, the webbing tension does not have to be released first.

The optional additional lock on the connector's anchor end disables the push-button release, providing an extra measure of security.

The connector can also form the basis for a rigid-link child seat connection system, wherein the child seat is rigidly or semi-rigidly connected to the anchor bar, rather than using webbing at one end of the connector.

Further objects and advantages of my invention will become apparent from a consideration of the drawings and ensuing description.

SUMMARY OF THE INVENTION

This invention is a device which connects a child safety seat, such as that used in an automobile, to an anchor bar installed in the automobile.

DESCRIPTION OF THE DRAWINGS

FIG. 9 shows the swivel lock in an unlocked position, and FIG. 10 shows the swivel lock in a locked position.

DETAILED DESCRIPTION OF THE INVENTION

Figure 1:
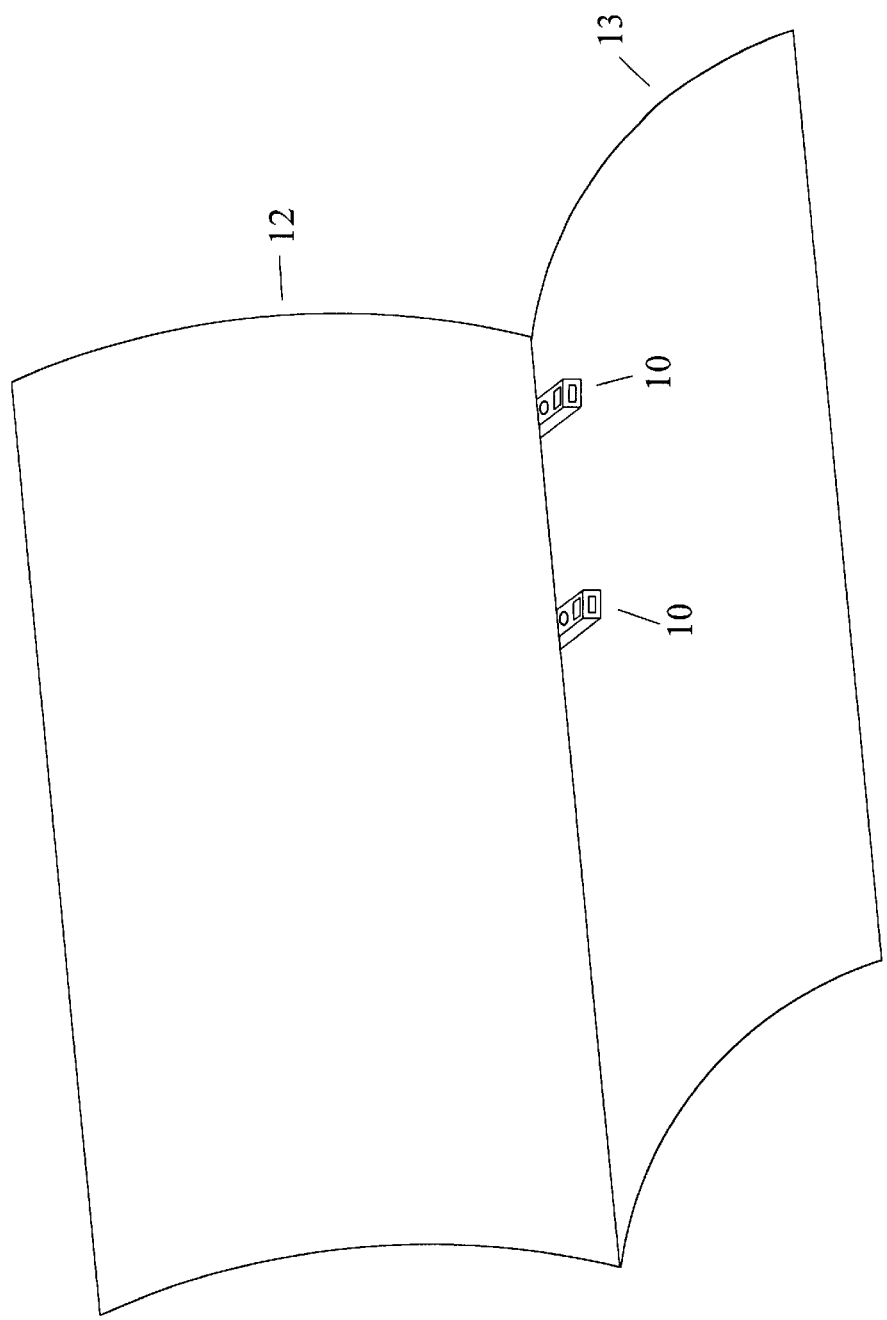
FIG. 1 provides an overall view of the invention, installed on a rear automobile seat.

The following provides a list of the reference characters used in the drawings:

10. Connector
11a&b. Child seat anchor
12. Automobile seat back
13. Automobile seat cushion 14a&b. Arms
15. Anchor bar
16. Anchor end
17. Child seat end
18. Docking guide
19. Latch plate
20a&b. Anchor arm openings
21. Anchor release button
22. Child seat release button
23. Latch arm
24. Pivot arm
25. Anchor bar cavity
26. Spring
27. Child seat latch
28. Automobile body
29. Webbing
30. Buckle tongue
31. Webbing retention pin
32. Webbing loop
33. Hook retention pin
34. Hook
35. Swivel lock
36. Slotted anchor end
37. Slot FIG. 1 provides an overall view of the invention, installed on a rear automobile seat. A connector 10 is engaged onto each of two child seat anchors 11a&b (not shown in FIG. 1) attached to the body of the automobile and located at the intersection point of an automobile seat back 12 and an automobile seat cushion 13. Child seat anchors 11a&b, shown in detail in FIGS. 4–6, each comprise two arms 14a&b connected by a cylindrical anchor bar 15 to form an attachment point for a child safety seat, and conform to the National Highway Traffic Safety Administration standard established by 49 CFR Parts 571 and 596 (Uniform Child Restraint Anchorages).

Figure 2:
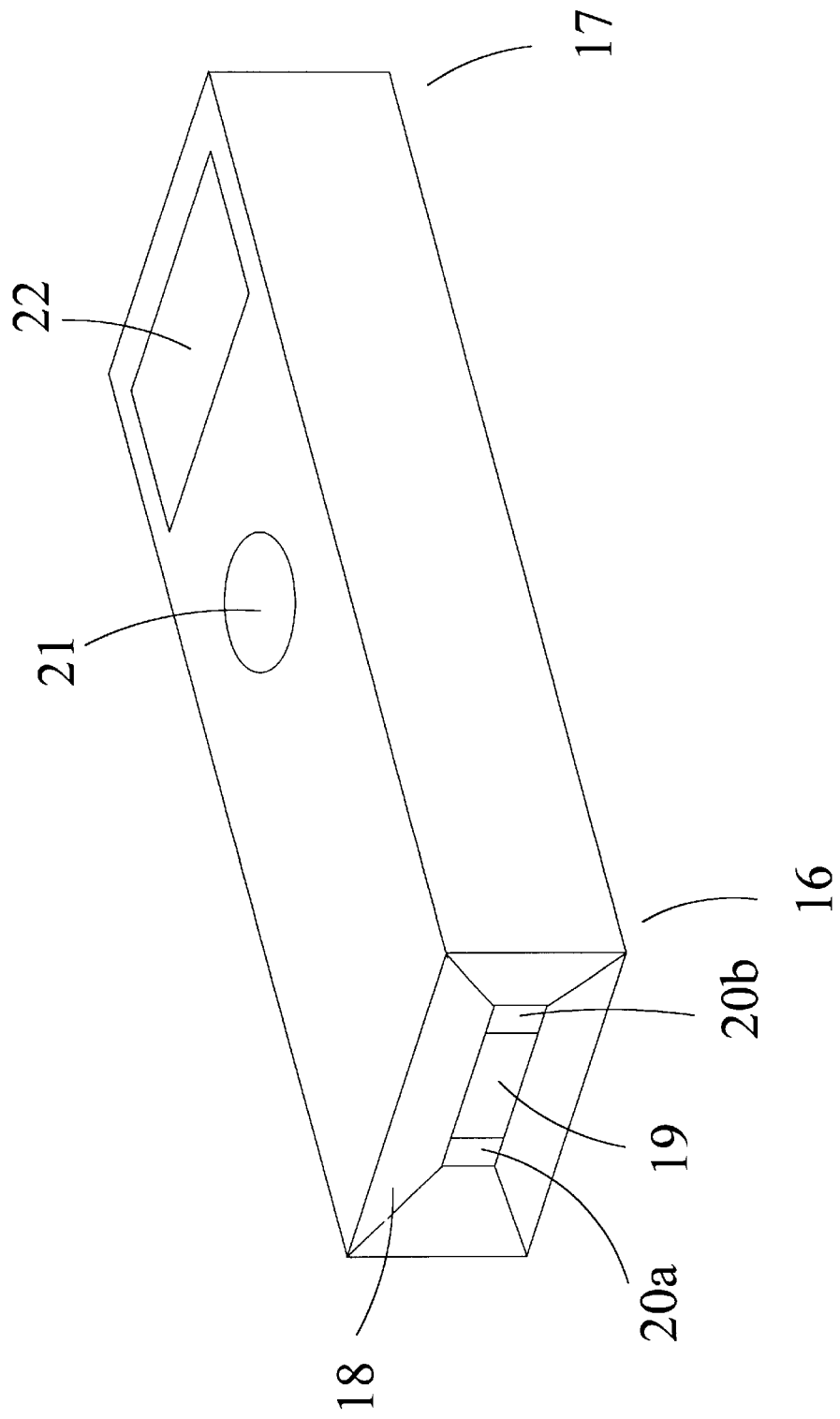
FIG. 2 illustrates the exterior aspects of the connector, in perspective view.

FIG. 2 illustrates the exterior aspects of connector 10, in perspective view. Connector 10 includes an anchor end 16 adapted to engage child seat anchor 11a, and a child seat end 17 adapted for connecting to either flexible webbing or a solid connection point on a child safety seat. Anchor end 16 has an inwardly beveled surface which forms a docking guide 18. Docking guide 18 surrounds a rectangular area in the center of anchor end 16, wherein a latch plate 19 and two anchor arm openings 20a&b are located. Anchor arm openings 20a&b are positioned on opposite sides of latch plate 19. An anchor release button 21, used to disengage connector 10 from child seat anchor 11a, is located on the top exterior surface of connector 10. A child seat release button 22, used to disengage connector 10 from a child safety seat, is also located on the top exterior surface of connector 10.

Figure 3:
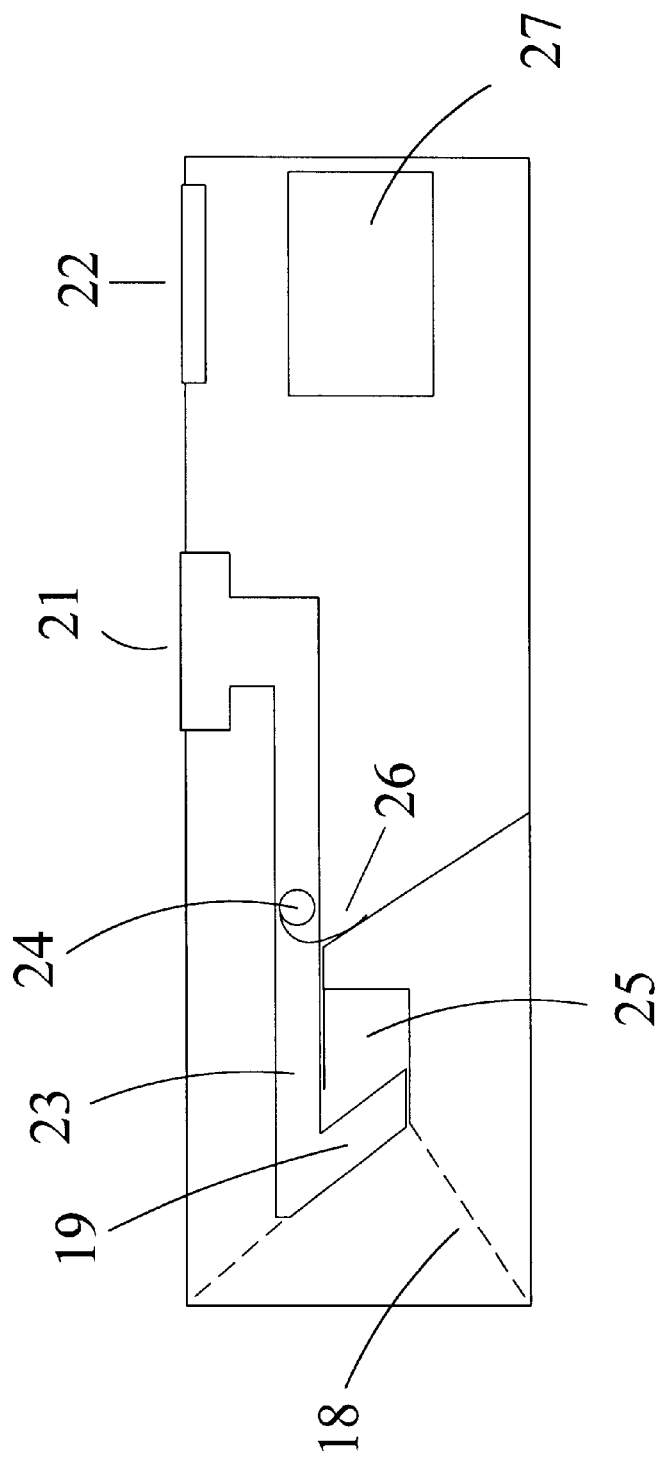
FIG. 3 shows the connector in cutaway side view, and illustrates the inner latch mechanism which captures and retains the child seat anchor within the connector.
Figure 4:
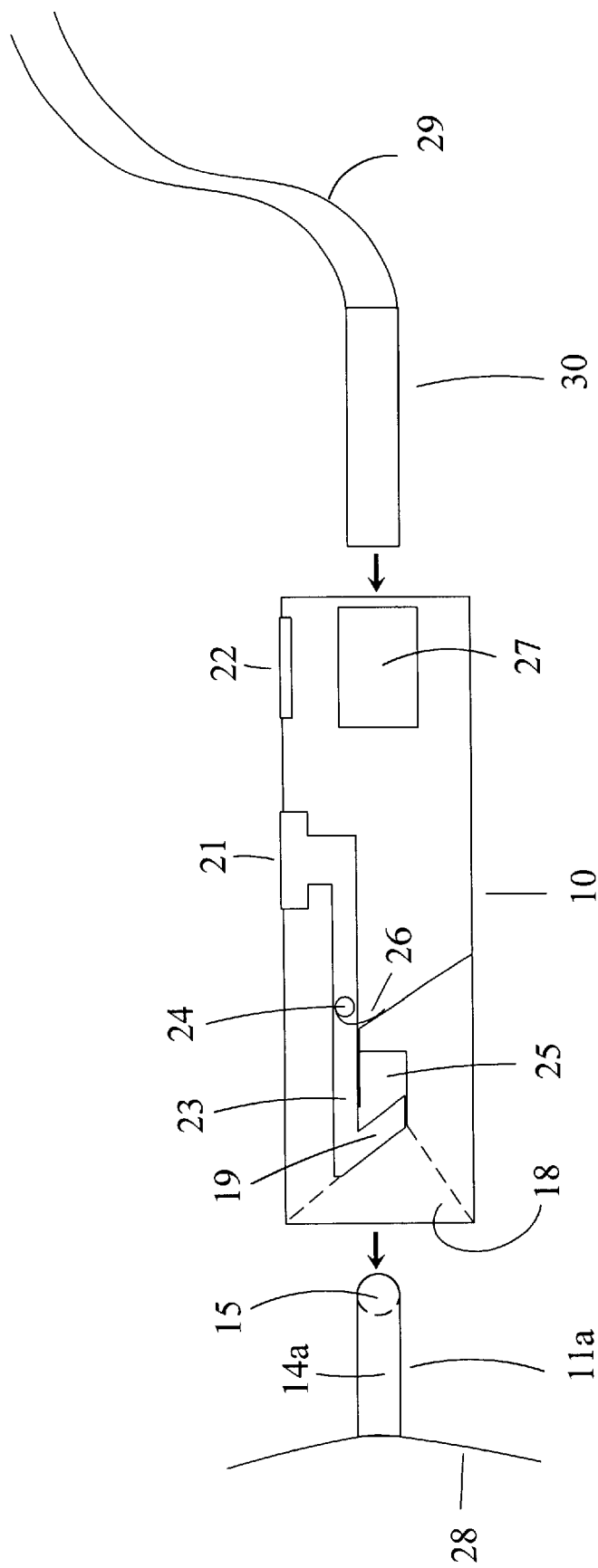
FIG. 4 shows the child seat anchor, the connector, and the webbing attachment in side view, with the connector in position to engage the child seat anchor.
Figure 5:
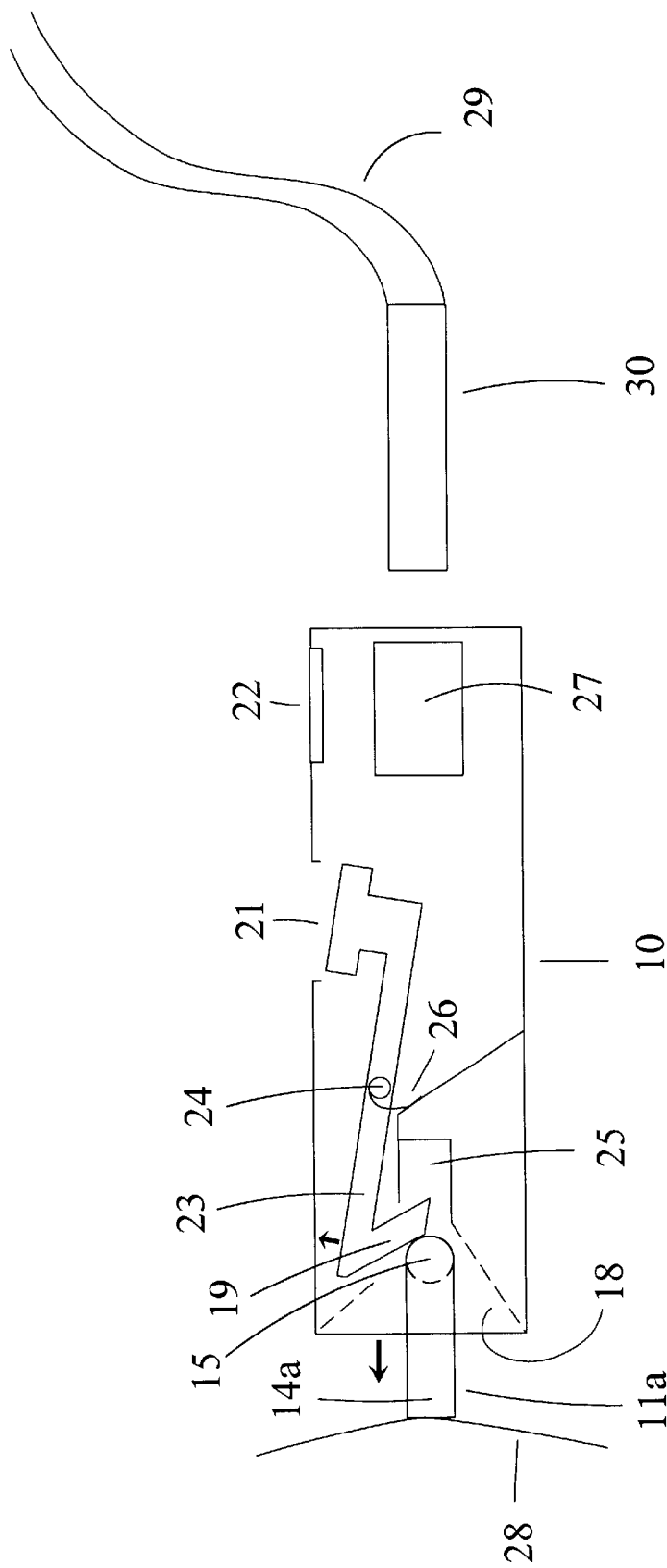
FIG. 5 shows the connector in the process of engaging onto the child seat anchor.
Figure 6:
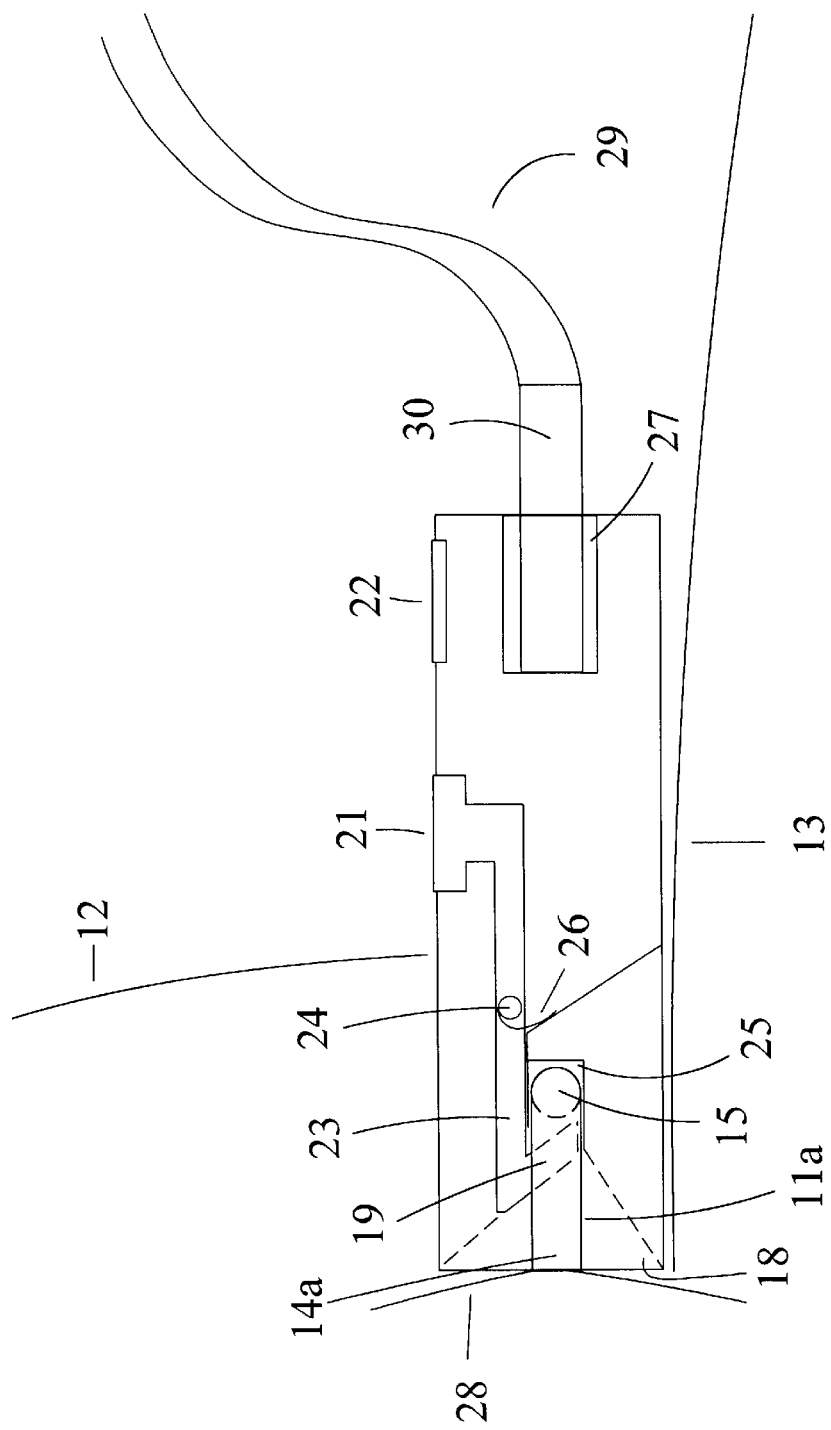
FIG. 6 illustrates the connector in a fully engaged position, wherein the anchor bar of the child seat anchor is retained within the anchor bar cavity in the connector, and the webbing and buckle tongue are engaged with the child seat latch.

FIG. 3 shows connector 10 in cutaway side view, and illustrates the inner latch mechanism which captures and retains child seat anchor 11a within connector 10. A latch arm 23 connects latch plate 19 and anchor release button 21, and pivots on pivot arm 24. A spring 26 biases latch arm 23, and thus latch plate 19, toward a downward, closed position. Latch plate 19 has a beveled front surface in order to facilitate the passage of the anchor bar 15 portion of child seat anchor 11a into an anchor bar cavity 25. Latch plate 19 also has a beveled back surface, in order to assure positive retention of anchor bar 15 inside anchor bar cavity 25. A child seat latch 27, shown in the figures as a "black box", is located within child seat end 17. Child seat latch 27 is operable by child seat release button 22, and can take the form of any available seat belt or other-type latch, examples of which are commonly known in the art. The operation of connector 10 is illustrated in FIGS. 4–6. As shown in FIG. 4, anchor end 16 of connector 10 is positioned over and urged toward child seat anchor 11a, which is attached to an automobile body 28. Before or after this step, a flexible webbing 29 attached to a child safety seat and having a buckle tongue 30 located on its non-child-seat end, is also connected to child seat end 17 of connector 10 via child seat latch 27. It should be noted that in addition to the flexible webbing connection shown in the figures, child seat end 17 can alternatively be connected, via child seat latch 27, to a rigid tongue or other connection point on a child safety seat.

FIG. 5 shows connector 10 in the process of engaging onto child seat anchor 11a. The beveled front surface of latch plate 19 allows anchor bar 15 to urge latch plate 19 upward, against the resistance provided by spring 26. Connector 10 is further urged onto child seat anchor 11a until anchor bar 15 passes under latch plate 19 and into anchor bar cavity 25. After anchor bar 15 has passed completely under latch plate 19, spring 26 biases latch arm 23, and thus latch plate 19, back down into a locked position.

FIG. 6 illustrates connector 10 in a fully engaged position, wherein anchor bar 15 of child seat anchor 11a is retained within anchor bar cavity 25, and webbing 29 and buckle tongue 30 are engaged with child seat latch 27. When connector 10 is in the fully engaged position, anchor bar 15 can only be withdrawn from anchor bar cavity 25 by first depressing anchor release button 21. Similarly, to release connector 10 from webbing 29 and buckle 30, the user depresses child seat release button 22.

Figure 7:
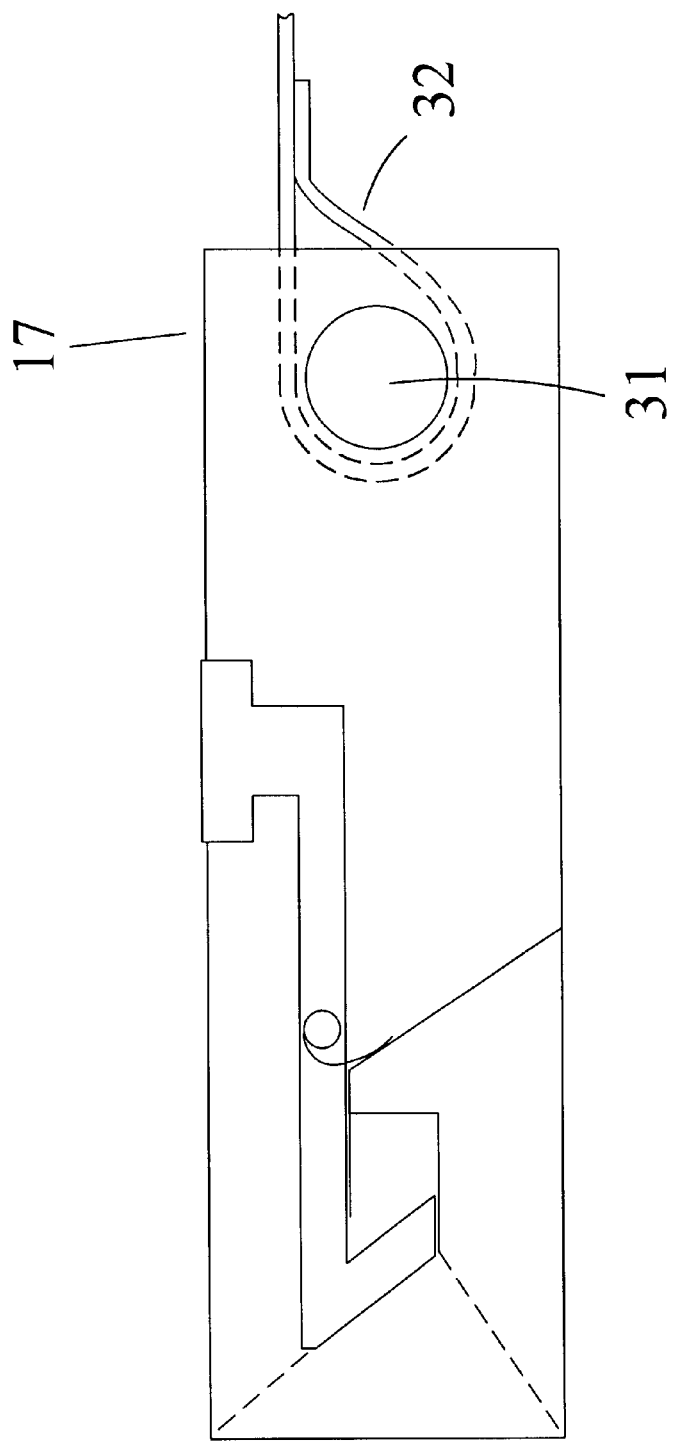
FIG. 7 illustrates an alternative embodiment wherein the child seat end of the connector includes a webbing retention pin, surrounded by a webbing loop which is attached to the child safety seat.

FIG. 7 illustrates an alternative embodiment wherein child seat end 17 includes a webbing retention pin 31, surrounded by a webbing loop 32 which is attached to a child safety seat. Other parts, and other operating steps, are the same as in the main embodiment.

Figure 8:
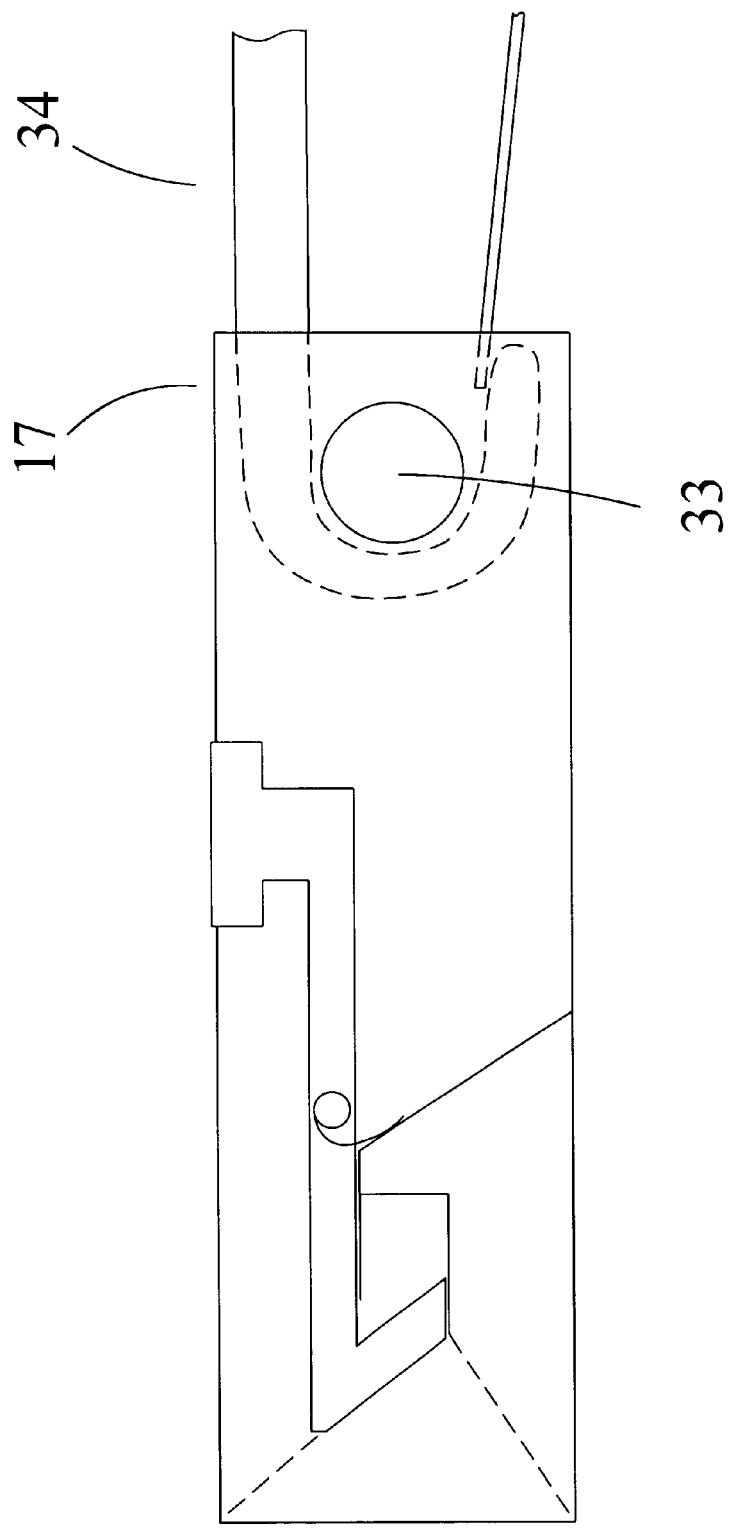
FIG. 8 illustrates an alternative embodiment wherein the child seat end of the connector includes a hook retention pin to which a hook, attached to the child safety seat, is connected.

FIG. 8 illustrates an alternative embodiment wherein child seat end 17 includes a hook retention pin 33 to which a hook 34, attached to a child safety seat, can be connected. Other parts, and other operating steps, are the same as in the main embodiment.

Figure 9:
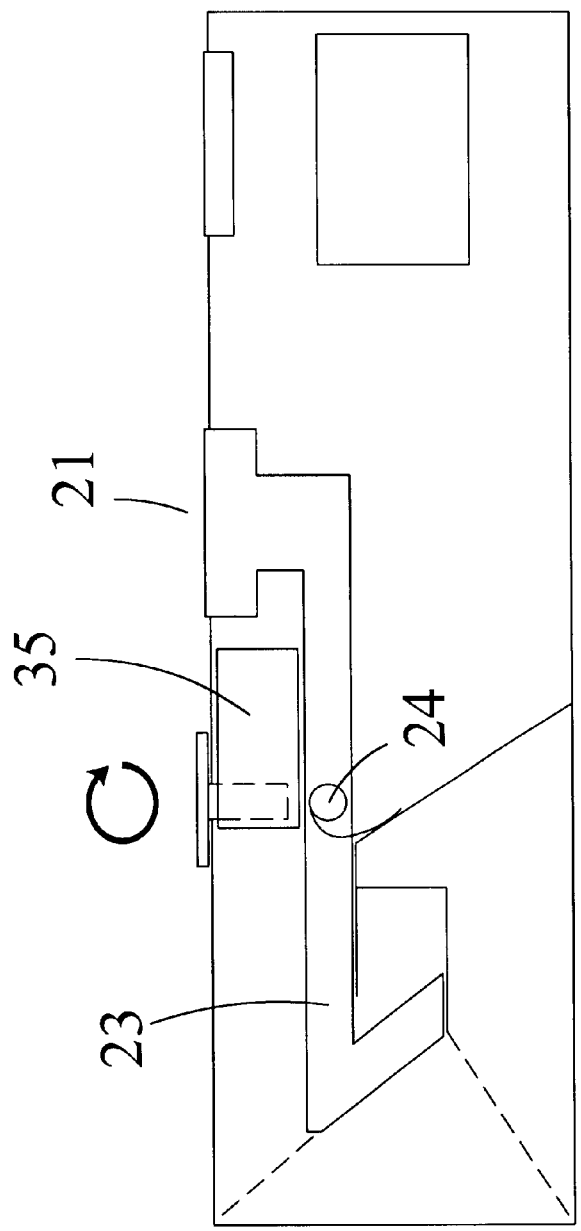
FIGS. 9 and 10 illustrate an alternative embodiment having a swivel lock, operable by a button located on the top surface of the connector.
Figure 10:
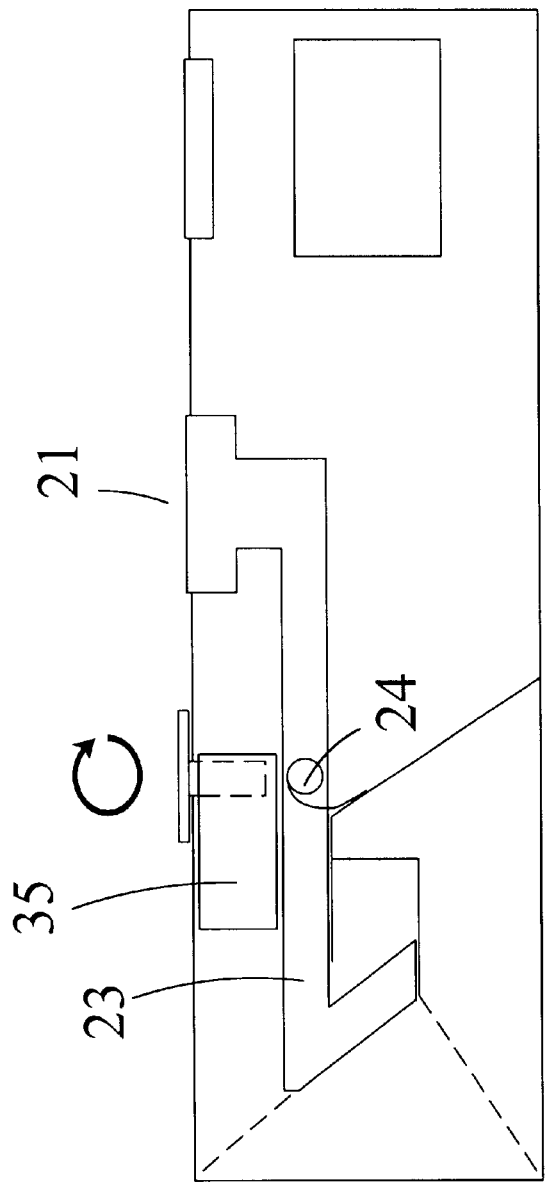

FIGS. 9 and 10 illustrate an alternative embodiment having a swivel lock 35, operable by a button located on the top surface of connector 10. FIG. 9 shows swivel lock 35 in an unlocked position, wherein the operation of anchor release button 21 and thus latch arm 23 is nor blocked, and latch arm 23 is free to pivot about pivot pin 24. FIG. 10 shows swivel lock 35 in a locked position, wherein anchor release button 21 cannot be depressed, and latch arm 23 is blocked from pivoting about pivot arm 24. Other parts, and other operating steps, are the same as in the main embodiment.

Figure 11:
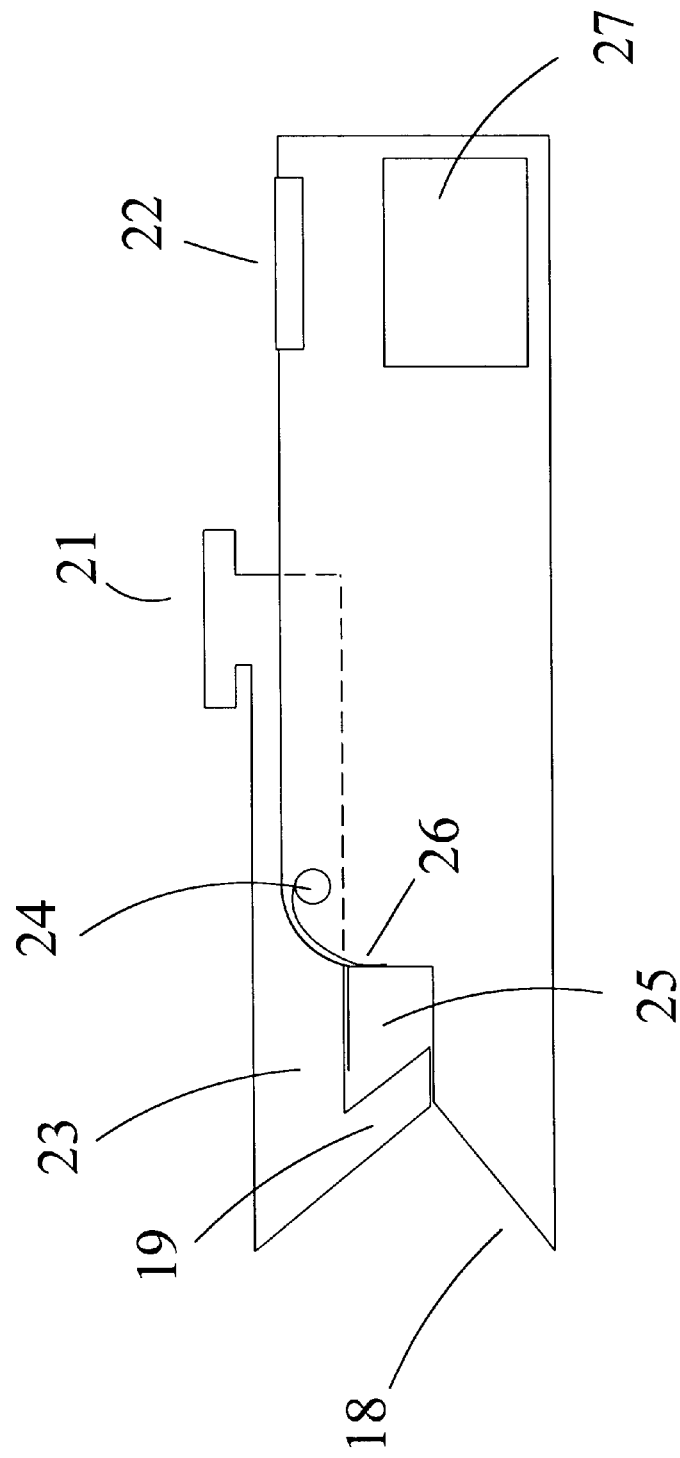
FIG. 11 illustrates an alternative embodiment, wherein the connector does not have an outer casing as in the main embodiment, but rather takes the form of a non-enclosed "clip".

FIG. 11 illustrates an alternative embodiment, wherein connector 10 does not have an outer casing as in the main embodiment, but rather takes the form of a non-enclosed "clip". Other parts, and other operating steps, are the same as in the main embodiment.

Figure 12:
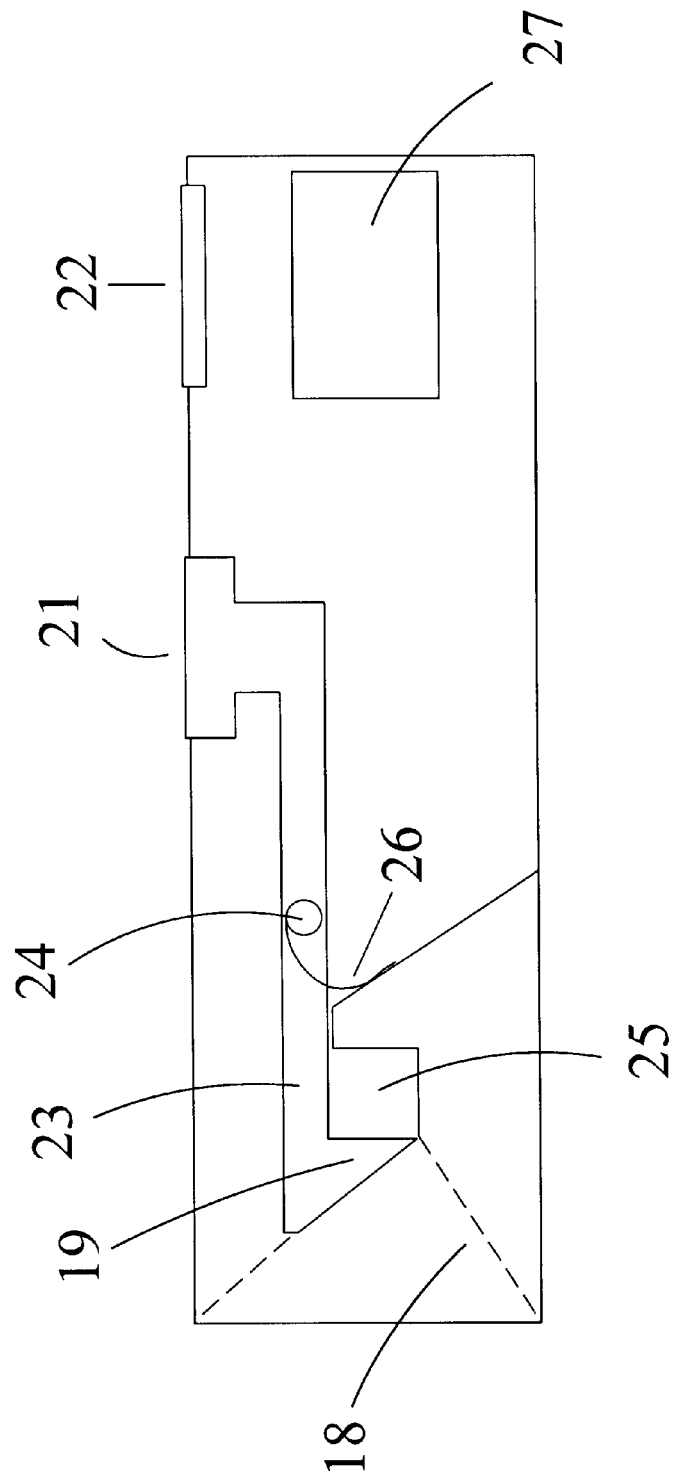
FIG. 12 illustrates an alternative embodiment, wherein the back (anchor bar-retaining) surface of the latch plate has a substantially non-beveled shape, rather than a beveled shape as in the main embodiment.

FIG. 12 illustrates an alternative embodiment, wherein the back (anchor bar-retaining) surface of latch plate 19 has a substantially non-beveled shape, rather than a beveled shape as in the main embodiment. Other parts, and other operating steps, are the same as in the main embodiment.

Figure 13:
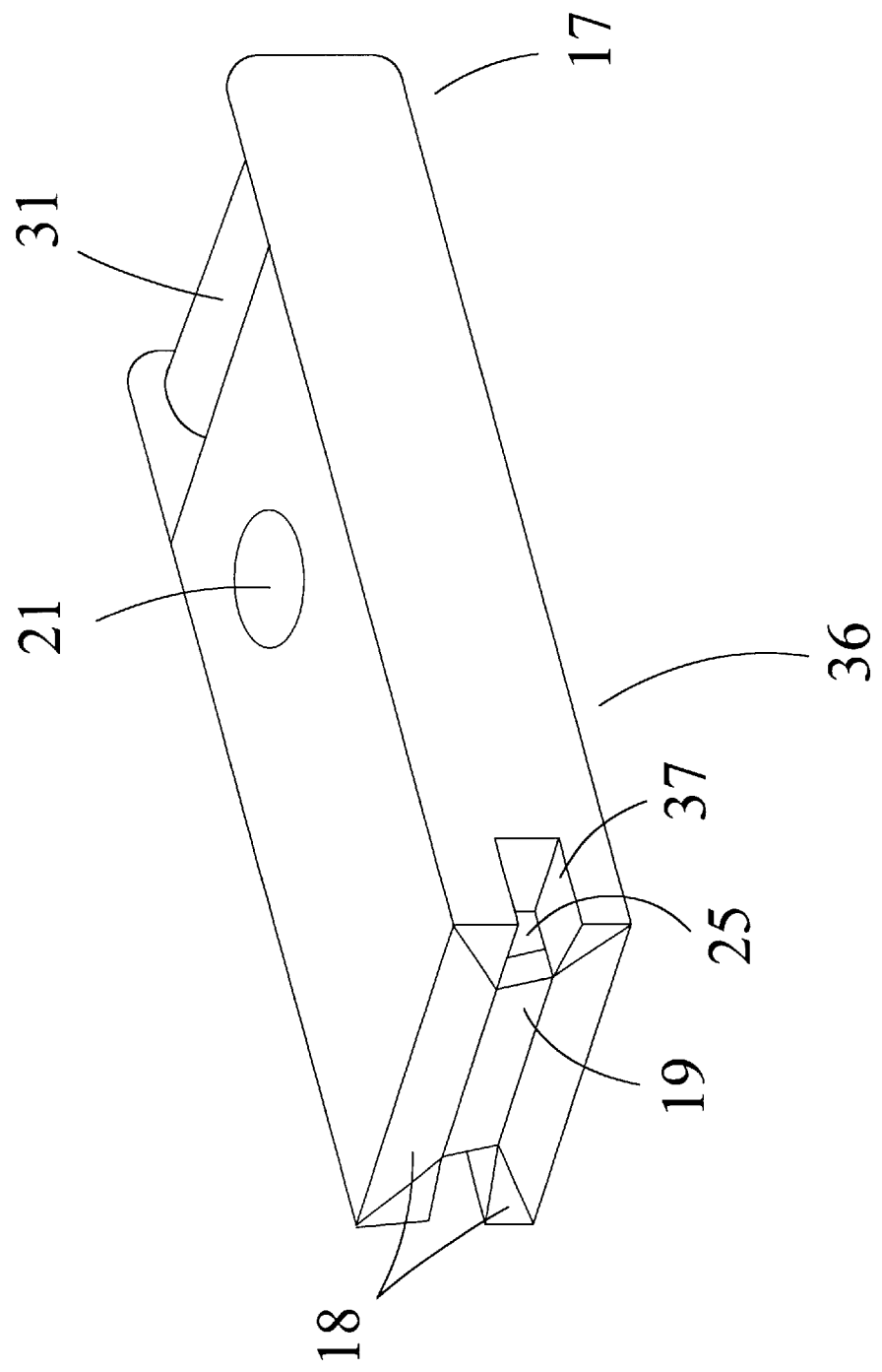
FIG. 13 illustrates an alternative embodiment, wherein the sides of the connector are "slotted" at the anchor end, in order to better accommodate anchor bars of varying widths.

FIG. 13 illustrates an alternative embodiment having a slotted anchor end 36, wherein a portion of both sides of the connector are removed to form a slot 37, in order to better accommodate anchor bars of varying widths. It can be appreciated that although FIG. 13 displays a child seat end 17 that is similar to that of FIG. 7 (i.e., a child seat end 17 to which a webbing loop 32 can be directly connected), the slotted anchor end 36 is applicable to connectors having other types of child seat ends 17.

Figure 14:
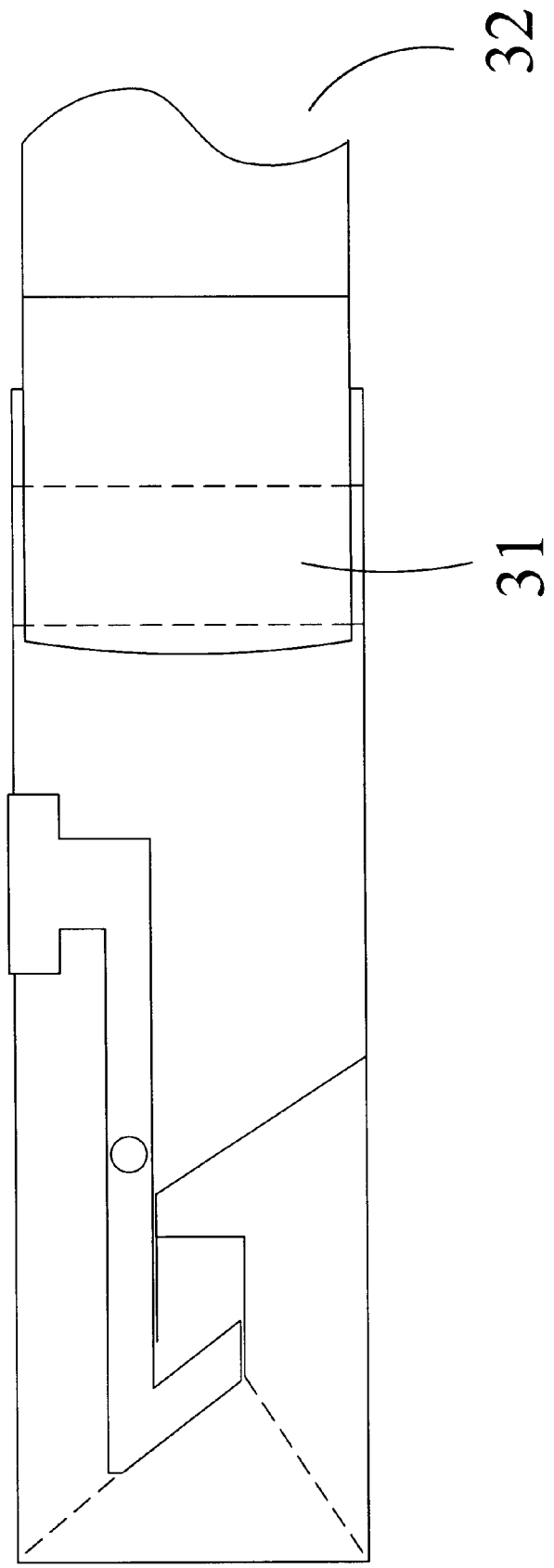
FIG. 14 shows an alternative embodiment similar to the alternative embodiments of FIGS. 7 and 8, but having a webbing retention pin which is vertically-oriented, rather than horizontally-oriented as in those embodiments.

FIG. 14 shows an alternative embodiment similar to the alternative embodiments of FIGS. 7 and 8, but having a webbing retention pin 31 which is vertically-oriented, rather than horizontally-oriented as in those embodiments. It can be seen that in this embodiment, the orientation of the webbing loop 32 is thus similarly vertical.

While the above descriptions contain many specificities, these shall not be construed as limitations on the scope of the invention, but rather as exemplifications of embodiments thereof. Many other variations are possible. Examples of just a few of the possible variations follow:

The length of the external casing of the connector—from the anchor end to the child seat end—and thus of course the length of the connector itself, can be different than that shown in the main embodiment.

The latch plate shape and structure can be different than that of the main embodiment, and FIG. 12 illustrates just one example of such an alternative latch plate structure.

The anchor and child seat release buttons can be located differently on the surface of the connector.

The docking guide surface can be arcuate—that is, have an inwardly curved nature, rather than angularly beveled as in the main embodiment.

The pivot point can be located at a different point along the length of the latch arm.

Various methods can be employed to spring-bias the latch arm, and thus the latch plate, to a closed position.

Different methods of blocking the latch arm from pivoting, and thus locking the latch plate in a downward and locked position, can be employed. A "slide lock", in which a blocking element slides into position to block the pivoting of the latch arms, constitutes just one example of such an alternate method.

The use of a "black box" to illustrate the child seat latch serves to indicate that any one of a number of different, available latch mechanisms can be employed at the child seat end of the connector. These various latch mechanisms are well known in the prior art.

The outer sides of the connector, at the anchor end, can be further "cut away" (i.e., the slot extends further down both sides of the connector, and/or the front of the connector's anchor end can be beveled or arcuate, so that the connector can more freely swivel about the anchor bar. This freedom of side-to-side movement would be beneficial if the consumer connected the child seat to an anchor bar not directly in back of the child seat, but rather to the side of it.

The release button can be recessed within the body of the connector, to prevent any possible inadvertent release. Similarly, the side walls of the "clip" embodiment of FIG. 11 can be higher than shown, in order to recess the release button within the body of the clip and provide additional protection against inadvertent release.

The child seat end of the connector can be a latch plate, rather than a buckle into which a latch plate is inserted. All that is required, for those embodiments which do not have a permanent webbing connection, is that the latch means used on the webbing or rigid link end of the connector connect with corresponding latch means on the child seat.

The slot at the anchor end of the connector can be on both sides of the connector, as shown in the main embodiment, or alternatively, it can be on just one side of the connector. Either way, the connector will thus accommodate anchor bars of varying widths.

I claim:

1. A device which connects a child safety seat to a vehicle anchor bar, comprising:
   (a) a first end and a second end, and
   (b) latch means, located at said first end, for capturing and retaining said vehicle anchor bar within said device, said latch means comprising a latching plate adapted to latch said vehicle anchor bar and having a substantially beveled, vehicle anchor bar-engaging leading edge, through which said leading edge said vehicle anchor bar passes and behind which said leading edge said vehicle anchor bar is retained, and
   (c) connecting means, located at said second end, for attaching said device to said child safety seat, said connecting means comprising a flexible belt,
   whereby said child safety seat is securely fastened to said vehicle anchor bar.

2. The device of claim 1, wherein said device also comprises a slot located on at least one side of said first end.

3. The device of claim 1, wherein said latching plate is spring-biased.

4. The device of claim 1, wherein said device also comprises a beveled docking guide located at said first end of said device.

5. The device of claim 1, wherein said device also comprises anchor bar release means located on an outer surface of said device.

6. The device of claim 5, wherein said anchor bar release means is a push button.

7. The device of claim 5, wherein said device also comprises means for disabling said anchor bar release means.

8. The device of claim 7, wherein said means for disabling comprise a swivel lock.

9. A device which connects a child safety seat to a vehicle anchor bar, comprising:
   (a) a first end and a second end, and
   (b) latch means, located at said first end, for capturing and retaining said vehicle anchor bar within said device, and
   (c) connecting means, located at said second end, for attaching said device to said child safety seat, said connecting means comprising a second anchor bar adapted to engage with a hook or other fastener attached by a flexible belt to said child safety seat,
   whereby said child safety seat is securely fastened to said vehicle anchor bar.

10. The device of claim 9, wherein said latch means comprises a latch plate having a substantially beveled, vehicle anchor bar-engaging leading edge, through which said leading edge said vehicle anchor bar passes and behind which said leading edge said vehicle anchor bar is retained.

11. The device of claim 9, wherein said device also comprises a slot located on at least one side of said first end.

12. The device of claim 9, wherein said device also comprises a beveled docking guide located at said first end of said device.

13. The device of claim 9, wherein said device also comprises anchor bar release means located on an outer surface of said device.

14. The device of claim 13, wherein said anchor bar release means is a push button.

15. The device of claim 13, wherein said device also comprises means for disabling said anchor bar release means.

16. The device of claim 15, wherein said means for disabling comprise a swivel lock.

17. A device which connects a child safety seat to a vehicle anchor bar, comprising:
(a) a first end and a second end, and
(b) latch means, located at said first end, for capturing and retaining said vehicle anchor bar within said device, said latch means comprising a pivoting latch plate having a substantially inwardly beveled, vehicle anchor bar-retaining trailing edge, behind which said trailing edge said vehicle anchor bar is retained, and
(c) connecting means, located at said second end, for attaching said device to said child safety seat, said connecting means comprising a flexible belt,
whereby said child safety seat is securely fastened to said vehicle anchor bar.

18. The dice of claim 17, wherein said device also comprises a slot located on at least one side of said first end.

19. The device of claim 17, wherein said latch plate is spring-biased.

20. The device of claim 17, wherein said device also comprises a beveled docking guide located at said first end of said device.

21. The device of claim 17, wherein said device also comprises anchor bar release means located on an outer surface of said device.

22. The device of claim 21, wherein said anchor bar release means is a push button.

23. The device of claim 21, wherein said device also comprises means for disabling said anchor bar release means.

* * * * *